March 15, 1960     E. W. FERDIG     2,928,701
ROLLER CONSTRUCTION
Filed Aug. 13, 1956
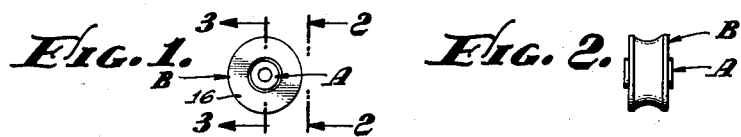
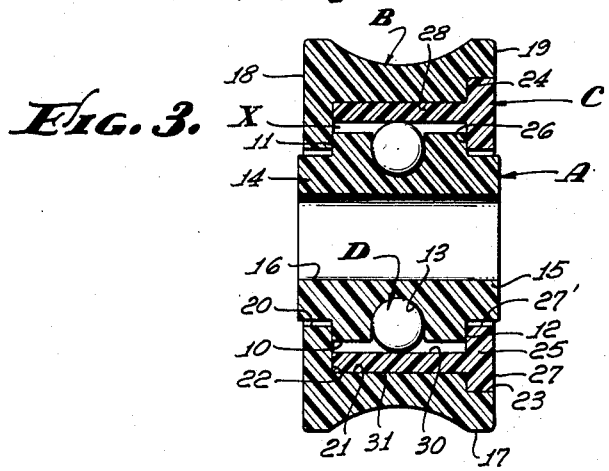
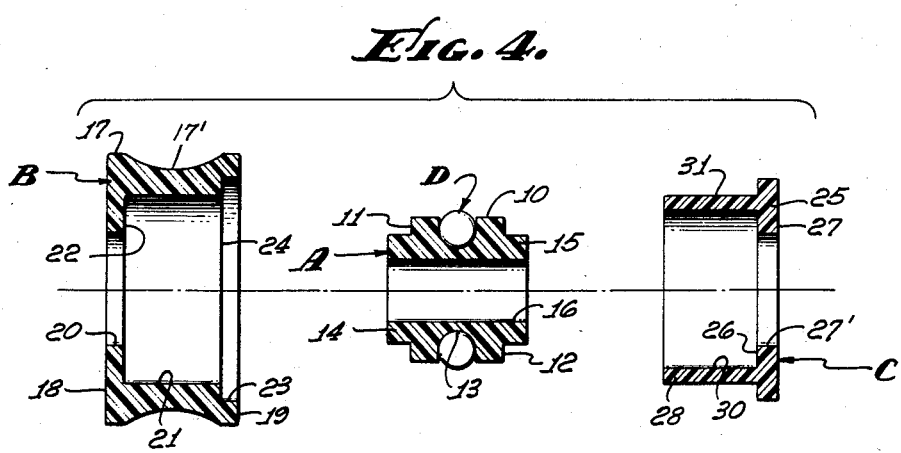
INVENTOR.
EARL W. FERDIG
BY
AGENT.

United States Patent Office 2,928,701
Patented Mar. 15, 1960

2,928,701

ROLLER CONSTRUCTION

Earl W. Ferdig, Eagle Rock, Calif., assignor to George F. McMurray, Glendale, Calif.

Application August 13, 1956, Serial No. 603,739

2 Claims. (Cl. 308—190)

This invention relates to a new and novel ball bearing roller construction and is more particularly concerned with a ball bearing roller construction involving three molded plastic elements and an annular row of ball bearings.

The ordinary ball bearing roller is formed of metal or steel and includes several parts, each of which is formed by a suitable machining operation and further includes an annular row of steel balls. The ordinary roller of the character referred to above is wanting in several ways. First, it is extremely heavy; second, it is subject to becoming rusted or oxidized; and, third, it is noisy and is subject to squeaking when it is run across a surface, especially when it becomes rusted.

A further disadvantage of the ordinary steel or metallic ball bearing roller construction arises during assembly. Due to the necessary hardness of the metal parts establishing the races for the rows of balls, the elements going to make up the rollers must be machined accurately so as to fit properly together without becoming bound or misaligned and must be suitably held in assembled condition by a suitable retainer or as by deforming or stacking a portion of one of the parts, which portion must be especially provided for the purpose of maintaining the parts assembled.

An object of this invention is to provide a novel ball bearing roller construction which is light in weight, a roller which is not subject to becoming rusted or oxidized, and a roller which is quiet and smooth in operation.

A further object of my invention is to provide a roller construction in which each of the elements going to make up the roller, except for the ball bearings, is molded of a tough, durable and slightly yieldable plastic material such as "nylon."

It is another object of the present invention to provide a roller construction of the general character referred to having but three plastic elements, one being a central supporting hub, and the other two cooperating to establish an outer relatively rotatable work engaging assemblage. The central hub element of my roller construction is provided with an annular groove or race to receive the row of ball bearings. The two elements establishing the rotatable work engaging assemblage of the roller are press fitted together to occur around and maintain the bearings engaged in the race in the hub section, and have portions engaging the central hub section to maintain the rotatable assemblage in proper working engagement relative to the hub section.

The various objects and features of my invention will be fully understood from the following detailed description of a typical preferred form and application of my invention, throughout which description reference is made to the accompanying drawings, in which:

Fig. 1 is a full size elevational view of the structure provided by the present invention. Fig. 2 is an elevational view of the structure shown in Fig. 1 and taken as indicated by line 2—2 on Fig. 1. Fig. 3 is an enlarged detailed sectional view of the roller construction that I provide and taken as indicated by line 3—3 on Fig. 1. Fig. 4 is an exploded view of my roller construction and showing the various elements in section.

The ball bearing roller construction provided by the present invention and illustrated throughout the accompanying drawings includes, a central hub section A, an outer work engaging section B occurring around the hub section A, an intermediate retainer section C slidably engaged in the work engaging section B to occur around the hub section A, and an annular row of ball bearings D engaged between the hub section A and the intermediate section C.

The central hub section A is a simple elongate member having a straight cylindrical outer wall 10, flat end walls 11 and 12 and an annular radially outwardly opening groove or ball race 13 in the side wall 10 and spaced between the ends 11 and 12. The hub section A further includes cylindrical trunnions 14 and 15 of reduced diameter and projecting axially from the end walls 11 and 12 of the said section and an elongate central bore 16 extending through the sections from one end thereof to the other end through the trunnions.

The outer work engaging section B of my roller construction is an elongate cylindrical member having an outer work engaging surface 17, flat radially disposed ends 18 and 19, a central bore 20, a counterbore 21 of considerable diametric and longitudinal extent entering the section from the end 19 thereof and terminating at a flat bottom 22, and a second counterbore 23 of limited longitudinal extent entering the end 19 of the section B concentric with the counterbore 21 and establishing a flat radially disposed annular stop shoulder 24.

In the particular case illustrated, the work engaging surface 17 of the section B is shown as having an annular recess 17' intermediate its ends and adapted to cooperatively engage a piece of work, as for instance a rail or the like.

The section B is adapted to receive and house the hub section A, the intermediate retainer section C, and bearings D in a manner that will hereinafter be described.

The intermediate retainer section C is shown as including a flat radially disposed body portion 25 having flat inner and outer end faces 26 and 27, a central bore 27', and an elongate tubular extension 28 projecting from the inner end face 25 of the body portion and having straight cylindrical inner and outer surfaces 30 and 31.

The body portion 25 of the section C corresponds in radial and longitudinal extent with the second counterbore 24 in the section B and is adapted to be press fitted therein to establish flat, butted engagement with the stop shoulder 24 established thereby. The tubular extension 28 of the section C projects from the inner end face 26 of the body portion 25 of the retainer C at a point spaced between the inner and outer peripheries of the body portion 25 and concentric with the bore 27' therein. The extension 28 corresponds in outside diameter and in longitudinal extent with the wall of the first-mentioned counterbore 21 in the section B and is press fitted into the section B.

With the above relationship of parts it will be apparent that when the sections B and C are engaged and pressed together in the manner set forth above, the inner cylindrical surface 30 of the retainer extension 28, the inner end face 26 of the body portion 25 of the retainer C, and the flat bottom 22 of the first-mentioned counterbore 21 in the section B cooperate to establish a radially inwardly opening channel X in which the hub section A and the bearings D are engaged. The hub section A is arranged in the chamber X so that its ends 11 and 12 oppose the bottom 22 of the socket 21 and the inner end face 26 of the retainer C and is held against excessive longitudinal shifting relative to the sections B and C thereby. In practice, sufficient clearance is maintained between the ends 11 and 12 of the hub and the opposing surfaces to assure free relative rotation between the various moving parts.

The inside diameter of the extension 28 of the section C is considerably larger than the outside diameter of the hub section A and is adapted to freely receive the bearings D engaged in the race 13 in the hub section when the construction is assembled and as clearly illustrated in Fig. 3 of the drawings.

The trunnions 14 and 15 projecting axially from the ends 11 and 12 of the hub section A project freely through the bores 20 and 27' in the sections B and C to terminate at a point spaced axially from the ends 18 and 19 of the section B and serves to engage the supporting means which may be provided for the roller and to maintain the rotatable sections B and C clear and free of the support means.

In practice, and when desired, a suitable axle member (not shown) can be engaged in the bore 16 of the hub section A to provide support for the roller construction.

The sections A, B, and C of my construction are molded of lightweight plastic material such as one of the several long chain Polymeric Amids, commonly referred to as "nylon." The ball bearings D are preferably formed of steel.

In practice, the inside diameter of the extension 28 on the section C is slightly undergauged to receive the ball bearings D when the construction is assembled so that considerable force is required to urge the construction into assembled condition. After the structure is engaged in the manner clearly illustrated in Fig. 3 of the drawings and upon rotation of the relatively rotatable assemblages, a number of turns, the body of plastic establishing the extension 28 on the retainer C yields and takes a set to allow for free running engagement of the ball bearings D, and in effect, establishes an outer race for the balls.

The above-mentioned yielding of the extension 28 to the ball bearings D also serves to tighten the engagement between the extension 28 of the retainer C in the bore 21 of the section B.

In practice, once the sections B and C have been assembled around the hub A and the bearings D, they will not separate under normal working conditions. It is to be understood, however, that in practice, a suitable binder of cement, such as acetate cement, can be applied between the retainer section C and the section B, at any desired location, to permanently and positively join or secure the said sections in assembled conditions.

The ball bearing roller construction that I provide can be made in any desired size. However, it is primarily intended and is particularly adapted for small rollers such as are commonly used in traverse rod construction for draperies and the like and where they are not subject to excessive loads.

The ideal or preferred size of my roller construction is a roller measuring approximately 9/16" in diameter. A roller of the size set forth above and made in accordance with the present invention will weigh approximately 1.35 grams. A conventional steel ball bearing roller construction of the general size set forth above would weigh in excess of 4 grams.

From the foregoing, it will be apparent that I have provided a neat, compact, lightweight, ball bearing roller construction which is not subject to becoming rusted and oxidized, which is quiet and dependable in operation, and which involves a minimum number of parts, which parts are easy and economical of manufacture and which require little time and expense to assemble.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A ball bearing roller of the character referred to including, an elongate central hub section having flat oppositely disposed ends and a radially outwardly opening annular ball race intermediate its ends, an annular row of steel ball bearings engaged in said race, an intermediate coupling section having a flat radially disposed disc-shaped body occurring adjacent one end of the hub and a tubular extension projecting from one side thereof to occur around the hub and establish pressure engagement on the balls and an outer work engaging portion having a socket entering it from one end and terminating at a flat bottom, said tubular extension with said hub section and ball bearings engaged therein being press fitted in the socket with the other end of the hub section opposing the bottom of the socket, each of the said sections being molded of plastic material, said ball bearings engaging the coupling section, urging the said section into tight pressure engagement with the outer section and causing the plastic material to flow and establish an outer race in which the balls are free to roll.

2. A ball bearing roller of the character referred to including, an elongate central hub section having flat radially disposed ends and a radially outwardly opening annular ball race intermediate its ends, an annular row of steel ball bearings engaged in said race, an elongate intermediate coupling section having a flat radially disposed disc-shaped body occurring adjacent one end of the hub and an elongate extension projecting axially from one side thereof to occur freely around the hub and establishing pressure engagement on the balls, and an outer work engaging portion having an elongated longitudinally disposed socket entering it from one end and terminating at a flat radially disposed bottom, said tubular extension with said hub section and ball bearings engaged therein being press fitted into the socket with the other end of the hub section opposing the bottom of the socket, the hub section having trunnions of reduced diameter projecting axially from each end thereof to project through openings in the retainer and work engaging sections, and a central longitudinal bore in the hub section and adapted to receive a supporting member, each of said sections being molded of plastic material, said ball bearings engaging the coupling section, urging the said section into tight pressure engagement with the outer section and causing the plastic material to flow and establish an outer race in which the balls are free to roll.

References Cited in the file of this patent

UNITED STATES PATENTS

| | | |
|---|---|---|
| 882,753 | Grant | Mar. 24, 1908 |
| 1,627,558 | Grunwald | May 10, 1927 |
| 2,760,378 | Van Deventer | Aug. 28, 1956 |

FOREIGN PATENTS

| | | |
|---|---|---|
| 502,846 | Germany | July 21, 1930 |